Patented July 5, 1932                                                                1,866,430

UNITED STATES PATENT OFFICE

CHARLES J. STROSACKER, CHESTER C. KENNEDY, AND EARL L. PELTON, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING ALKALI-METAL ACETATES

No Drawing.        Application filed December 1, 1928.  Serial No. 323,199.

The present invention relates to methods for the conversion of acetylene to acetic acid, and in particular to methods wherein the immediate product so obtained is an acetate.

An object of our invention is to provide a method whereby relatively cheap and readily available raw materials may be utilized. Another object is to provide a simple and direct method of operation leading at once to a substantially quantitative conversion of raw materials into the desired acetate product without the material formation of intermediate products or final by-products. Still another object is to provide a method for the selective absorption and separation of acetylene from mixtures with other gases. Other objects will appear as the description proceeds.

To the accomplishment of the foregoing and related ends the invention, then, consists of the steps hereinafter fully described and particularly pointed out in the claims, the following description setting forth but a few of the ways in which the principle of the invention may be used.

It is known that acetylene will react with a fused anhydrous mixture of potassium and sodium hydroxides to form an alkali metal acetate. For example, Feuchter (Chem. Ztg. 38; 273–4, 1914) conducted acetylene gas into a molten caustic soda and potash mixture at a temperature of about 220° C. and recovered acetic acid by dissolving the resulting melt in water and acidifying. The caustic alkali mixture was completely dehydrated before use by heating to redness. It was stated that a yield of up to 60 per cent. of theory, based upon acetylene used, was obtained. When we investigated Feuchter's method, the unexpected discovery was made that the presence of water in the reaction materially improved the yield and gave a cleaner and purer product. Consequently, instead of carefully excluding water from the reaction, as previously had been thought necessary, we found that a substantially quantitative absorption of the acetylene was had if water was added. In working with a fused caustic alkali to which some water had been added, however, the water boiled out persistently at the reaction temperature and the fusion mass soon became too stiff to stir as the content of alkali metal acetate increased. We then found that a nearly complete conversion of the alkali to acetate may be realized by maintaining the alkali in a solid condition having an extended surface exposed to the acetylene. This is attainable by reacting the acetylene and water with solid caustic alkali in divided or comminuted form, either as such or mixed with the acetate product of the reaction, and with the fluid or solution form of alkali by mixing it with the acetate product, the reaction mixture being agitated during the absorption of the acetylene for the purpose of bringing fresh surfaces into reactive relation. The presence of the requisite amount of water was insured by operating in a closed vessel, the water then being present partly as vapor. It therefore became unnecessary to employ a low-melting point mixture of NaOH and KOH for the reaction. Consequently either sodium or potassium hydroxide alone can be used, although a mixture of the two is not precluded. Working in this way we have been enabled to attain a substantially quantitative conversion of acetylene and caustic alkali to alkali metal acetate.

The chemical reaction involved in our improved method apparently takes place in accordance with the following equation:

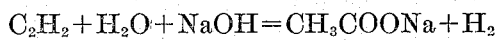
$$C_2H_2 + H_2O + NaOH = CH_3COONa + H_2$$

The sole products formed are hydrogen and alkali metal acetate, the latter being obtained in substantially pure form, nearly or quite free from carbon, tar or organic impurities, intermixed only with a small amount of excess caustic alkali from which it is readily separated by usual means.

The acetylene and caustic alkali are added approximately in the proportion of their combining weights as in the above equation. The water is preferably introduced gradually during the reaction, either as steam or as an aqueous solution of caustic alkali, at such rate that it is present in slight excess above that required by the equation. In order to provide the largest possible surface of the reaction mass exposed to the contact with acetylene, it is advisable to keep the mass in a more or less solid, finely divided or comminuted form. One form of apparatus well adapted for this purpose consists of a revolving cylinder or drum reactor charged with the reacting mass and with iron balls, or other like material, which exert a sufficient grinding action as the drum revolves to keep the reaction mass in a suitably comminuted form, but other forms of apparatus adapted to accomplish a similar purpose may be employed.

When caustic soda is used the temperature for carrying out the reaction may be between 150° C. and that at which the action of the caustic soda upon the acetate product commences to cause decomposition of the latter, such temperature being about 325° C. Preferably, however, the temperature at the beginning of the reaction is regulated at about 240° C. and gradually increased to about 290° to 300° C. at the end. Below 200° C. the reaction proceeds slowly. Pressure is not required, the reaction taking place readily at atmospheric pressure. In practice, however, we have found it convenient to maintain a pressure of about 50 to 60 pounds per square inch in the reactor, for the purpose of providing a greater charge of acetylene gas than can be introduced at ordinary pressure. When pure acetylene is used, it is not advisable to raise the pressure above about 100 pounds per square inch, for at the reaction temperature spontaneous decomposition of the acetylene tends to occur at such pressures. Decomposition of acetylene within the reactor is also influenced by the presence of air, consequently air should be excluded.

For the purpose of illustration, the following detailed example is given, but it is understood that the invention is not limited thereto.

A quantity of about 150 grams solid 95 per cent. NaOH was placed in an iron cylinder containing a quantity of iron balls and provided with suitable mechanism for rotating it. Pipe connections were provided for introducing acetylene, steam and aqueous caustic alkali solution, with suitable pressure indicating gauge. The cylinder was closed, the air displaced by blowing out with steam, and the whole apparatus brought to a temperature of about 240° C. while slowly revolving. A quantity of acetylene gas was then admitted, the amount being regulated so that the supply was shut off when the pressure gauge registered 50 pounds. No water was admitted at this stage, since the 5 per cent. water content of the solid caustic alkali sufficed to initiate the reaction. The reaction proceeded at once upon the introduction of the acetylene, but with no material change in pressure, inasmuch as a volume of hydrogen was formed equal to that of the acetylene consumed. The progress of reaction was followed through analysis of gas samples by absorption in bromine water. When the charge of acetylene was entirely used up, as shown by analysis of the gas, a relief valve was opened and the hydrogen gas in the reactor was allowed to blow off. The relief valve was then closed, a further quantity of acetylene was introduced and the reaction continued as before. When sufficient acetylene had been consumed to react with substantially all of the water in the original charge of caustic alkali, a further amount of water and alkali was introduced with the acetylene in the form of an approximately 50 per cent. NaOH solution, the quantity of solution being such that the water contained in it was at least equivalent to the acetylene in the charge. Operation was continued with alternate charging of fresh materials and discharging of hydrogen and with gradual increase of temperature up to about 280° C. until the total quantity of caustic alkali used, figured as anhydrous NaOH, amounted to 500 grams. Thereafter the addition of acetylene alone was continued until the time of absorption of a single charge, which at the beginning occurred in approximately 5 minutes, had increased to about 20 to 25 minutes, due to the progressively slower rate of reaction as the concentration of caustic alkali decreased. At this point the total reacting time from the beginning was about 24 hours and there remained in the mixture a residue of approximately 10 to 15 per cent. unreacted NaOH. The contents of the reactor were then dissolved out with water, the solution filtered from a small amount of insoluble matter, chiefly iron compounds, and the clear solution evaporated for the recovery of the solid reaction products. The yield was approximately 828 grams anhydrous sodium acetate and 82 grams NaOH, corresponding to a 96 per cent. conversion to sodium acetate of NaOH entering into reaction. The absorption of acetylene was substantially quantitative, except for from 2 to 5 per cent. loss with the hydrogen vented.

The detailed procedure herein described is intended to exemplify one preferred mode of carrying out our invention. Various modifications thereof will be readily apparent to those skilled in the art. For example, it is not essential to start the reaction with a charge of solid caustic alkali. A mixture of caustic alkali metal and alkali metal acetate, such as would be obtained from a previous run, or from any other source, may be used instead of the alkali alone. Thus we may remove only a portion of the product from one run, leaving the remainder in the reactor as the initial charge for the following operation. Under suitable control the caustic alkali may be introduced entirely as an aqueous solution thereof. The concentration of such caustic alkali solution may be made either materially greater or less than the figure of 50 per cent. specifically given in the example, the latter being merely a convenient strength for the particular conditions therein described.

Instead of caustic soda, caustic potash may be used for the reaction, or, if desired, a mixture of both. In general caustic potash or mixtures containing the same will react somewhat more rapidly and at a materially lower temperature, but on account of the lower cost, caustic soda will usually be preferred for commercial operations. The oxides or hydroxides of other alkali forming metals, e. g. lime or barium hydrate, may also be used but in such case the rate of reaction will be slower.

The hydrogen evolved may, of course, be recovered instead of being vented into the air, and in large scale production the apparatus would be designed with that end in view. Other forms of apparatus than the one referred to in the example may be employed without departing from the spirit of our invention. In large scale operations a series of reaction chambers, or a multi-chamber reactor, may be provided, if desired, the gaseous and liquid or solid reacting materials being passed in either counter current or unidirectional relation to each other.

Our improved method or process may be applied also for reaction with gas mixtures containing acetylene, when the gases accompanying the latter are themselves substantially inert in the present reaction. For example the utilization of gas mixtures containing, in addition to acetylene, either hydrogen, nitrogen, ethylene, methane or other gases is comprehended within the scope of our invention. The admixture of a diluting gas, such as one or more of those just mentioned, with the acetylene will permit of operation at higher pressure than 100 pounds per square inch, with a correspondingly shortened time of reaction.

Further, our improved method or process affords a simple and practicable means of separating acetylene from gaseous mixtures containing it, with the subsequent conversion of such recovered acetylene into an acetate and hydrogen. It is within the purview of our invention, therefore, to provide a process for the removal of acetylene from gaseous mixtures wherein it is contained together with one or more of other gases such as hydrogen, nitrogen, ethylene, methane, ethane, etc.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making an acetate and hydrogen which comprises reacting simultaneously between acetylene, a hydroxide of an alkali forming metal and water in a substantially solid, comminuted reaction mixture.

2. The method of making an acetate and hydrogen which comprises reacting simultaneously between acetylene, an alkali metal hydroxide and water in a substantially solid, comminuted mixture.

3. The method of making an acetate and hydrogen which comprises reacting simultaneously between acetylene, sodium hydroxide and water in a substantially solid, comminuted mixture.

4. The method of making sodium acetate and hydrogen which comprises reacting between acetylene, solid sodium hydroxide in comminuted form and water at a temperature above 150° C. but below that at which decomposition of the acetate product commences, the water being added gradually and in such amount that fusion or liquefaction of the reaction mixture is substantially avoided.

5. The method of making an alkali metal acetate and hydrogen which comprises subjecting an alkali metal hydroxide in solid, comminuted form to the action of an acetylene containing gas in the presence of water.

6. The method of making an alkali metal acetate and hydrogen which comprises subjecting an alkali metal hydroxide in solid, comminuted form to the action of an acetylene containing gas in the presence of water in at least equimolecular proportion to such acetylene.

7. The method of making an alkali metal acetate and hydrogen which comprises reacting between substantially solid alkali metal hydroxide in comminuted form, acetylene and water at a temperature above 150° C. but below that at which decomposition of the acetate product commences, the water being present in amount insufficient to cause complete fusion of the reaction mass at the temperature of reaction, and adding more acetylene and alkali metal hydroxide as the reaction progresses, such additional hydroxide being in the form of an aqueous solution thereof.

8. The method of making sodium acetate and hydrogen which comprises reacting between substantially solid sodium hydroxide in comminuted form, acetylene and water at a temperature above 150° C. but below that at which decomposition of the acetate product commences, the water being present in amount insufficient to cause complete fusion of the reaction mass at the temperature of reaction, and adding more acetylene and sodium hydroxide as the reaction progresses, such additional hydroxide being in the form of an aqueous solution thereof.

9. The method of making an alkali metal acetate and hydrogen which comprises subjecting an alkali metal hydroxide in solid comminuted form to the action of an acetylene containing gas in the presence of water at a temperature above 150° C. but below that at which decomposition of the acetate product commences, the water being present in amount insufficient to cause complete fusion of the reaction mass at the temperature of reaction.

10. The method of making sodium acetate and hydrogen which comprises reacting between substantially solid sodium hydroxide in comminuted form, acetylene and water at a temperature above 150° C. but below that at which decomposition of the acetate product commences, the water being present in amount insufficient to cause complete fusion of the reaction mass at the temperature of reaction, and maintaining the gaseous reaction components in contact with the solid components until reaction is substantially complete.

11. The method of separating acetylene from gaseous mixtures containing it which comprises subjecting such mixture to the action of a solid alkali metal hydroxide in comminuted form in the presence of water in amount insufficient to cause fusion or liquefaction thereof.

12. The method of separating acetylene from gaseous mixtures containing it which comprises contacting such mixture with solid caustic soda in comminuted form in the presence of water in amount insufficient to cause complete fusion thereof at a temperature above 150° C. but below that at which decomposition of the acetate product commences.

13. The method of absorbing acetylene from gaseous mixtures containing it which comprises contacting said gas with a hydroxide of an alkali forming metal intermixed with the acetate product of the reaction in the presence of water.

14. The method of making sodium acetate which comprises subjecting solid sodium hydroxide in comminuted form to the action of acetylene and water at a temperature between 200° and 300° C.

15. The method of making sodium acetate which comprises subjecting a substantially dry mixture of sodium hydroxide and sodium acetate in comminuted form to the action of acetylene and water at a temperature between 200° and 300° C.

16. The method of making sodium acetate which comprises grinding a substantially dry mixture of sodium hydroxide and sodium acetate and introducing acetylene and water thereto at a temperature between 200° and 300° C.

17. The method making an acetate which comprises reacting upon a hydroxide of an alkali-forming metal in solid comminuted form with acetylene and water simultaneously, dissolving the reaction product in water and separating acetate from the solution.

18. The method of making an acetate which comprises reacting upon an alkali metal hydroxide in comminuted form with acetylene and water simultaneously, dissolving the reaction product in water and separating alkali metal acetate from the solution.

19. The method of making sodium acetate which comprises reacting upon sodium hydroxide in solid comminuted form with acetylene and water simultaneously, dissolving the reaction product in water and separating sodium acetate from the solution.

20. The method of making an alkali metal acetate which comprises simultaneously reacting acetylene, water and an alkali metal hydroxide.

21. The method of making sodium acetate which comprises simultaneously reacting actylene, water and sodium hydroxide.

22. The method of making potassium acetate which comprises simultaneously reacting acetylene, water and potassium hydroxide.

23. The method of making an alkali metal acetate which comprises simultaneously reacting acetylene, water and a mixture of sodium hydroxide and potassium hydroxide.

24. The method of making an acetate which comprises simultaneously reacting acetylene, an alkali metal hydroxide and water at a temperature above 150° C. but below that at which substantial decomposition of the acetate product occurs.

25. The method of making sodium acetate which comprises introducing acetylene and water into a solid comminuted mixture of sodium hydroxide and sodium acetate while stirring the same and maintaining the temperature of the reaction mixture between 150° and 325° C.

Signed by us this 28 day of November, 1928.

CHARLES J. STROSACKER.
CHESTER C. KENNEDY.
EARL L. PELTON.